United States Patent Office 2,817,957
Patented Dec. 31, 1957

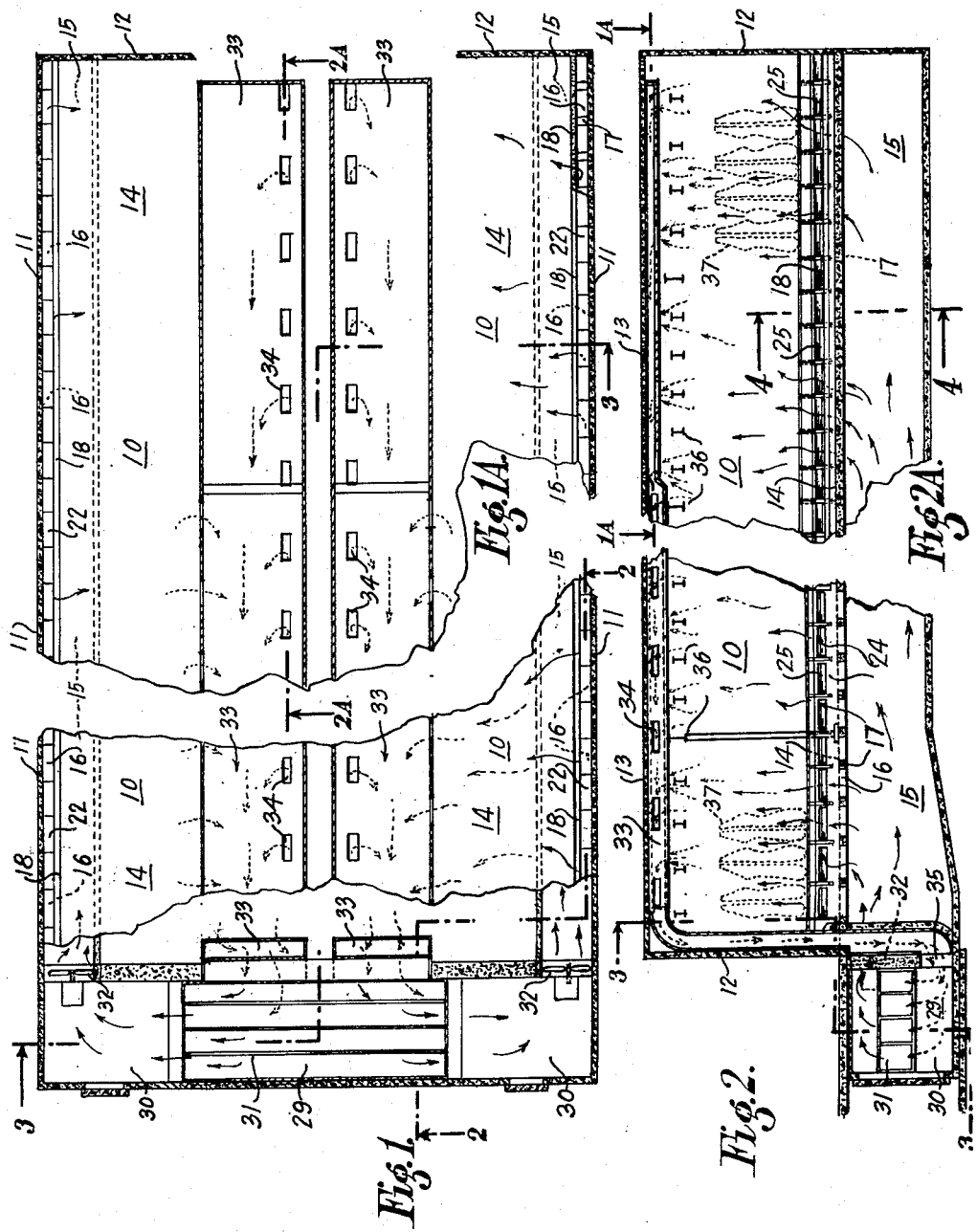
Dec. 31, 1957  J. E. ROWLAND  2,817,957
APPARATUS FOR CHILLING AND AGING ANIMAL CARCASSES
Filed July 11, 1955  2 Sheets-Sheet 1
INVENTOR,
John E. Rowland
BY
ATTORNEY Dec. 31, 1957 J. E. ROWLAND 2,817,957
APPARATUS FOR CHILLING AND AGING ANIMAL CARCASSES
Filed July 11, 1955 2 Sheets-Sheet 2
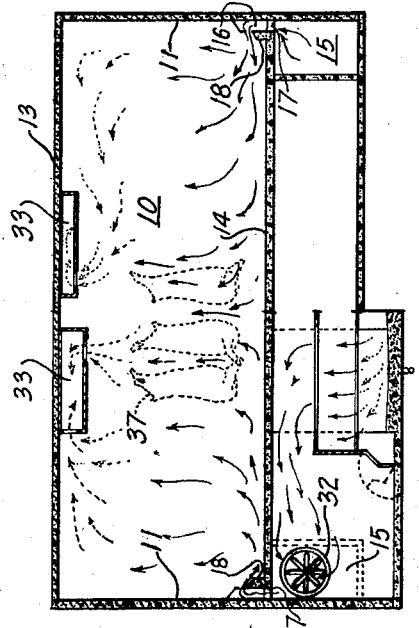
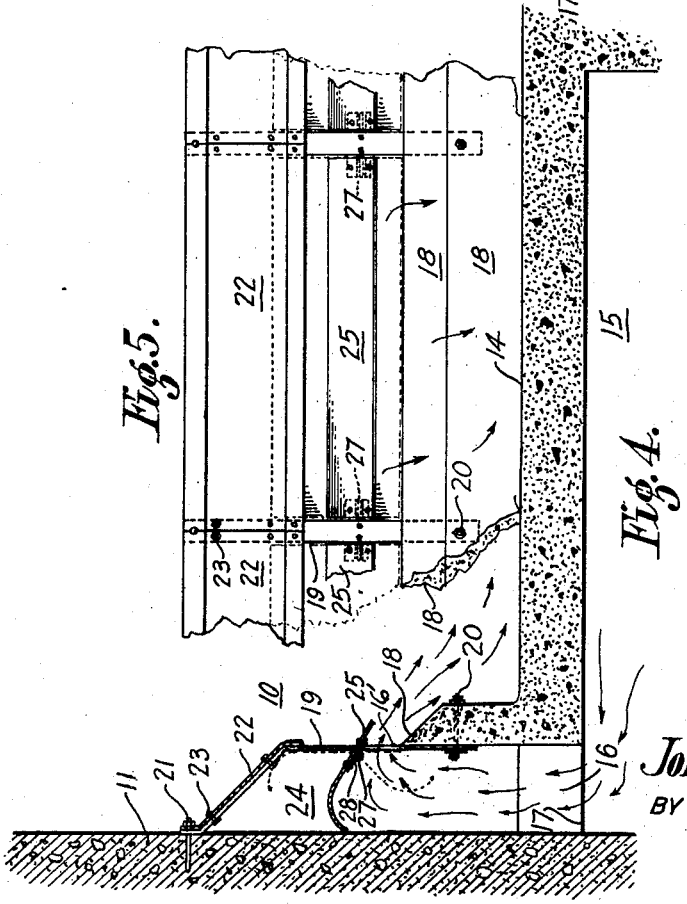
INVENTOR
John E. Rowland
BY
ATTORNEY

2,817,957

APPARATUS FOR CHILLING AND AGING ANIMAL CARCASSES

John E. Rowland, Berkeley, Calif.

Application July 11, 1955, Serial No. 521,006

7 Claims. (Cl. 62—102)

This invention relates to the refrigeration of meat products and more particularly to the chilling of the carcasses of freshly slaughtered beef, calves, sheep, hogs and the like and the holding of the carcasses in a chilled state during the hanging, aging and selling periods.

As heretofore practiced the warm carcasses of the slaughtered animals are first placed in a chill cooler where they are kept generally over night, whereupon the chilled carcasses are transferred to a separate refrigerated room or rooms where they are held for aging, selling, etc. When the warm carcasses are brought in contact with the cold air of the chill room the moisture which emanates from them saturates the cold air and produces a heavy fog, generally to such extent that the carcasses are soon dripping with the condensed moisture which forms on them. This moisture tends to create a slimy condition and when it remains on the carcasses for any appreciable length of time produces a poor quality of meat and gives rise to considerable discoloration and spoilage. It is in an effort to lessen this ill effect that resort is had to the aforesaid overnight cooling in a separate chill room. If attempt were made to hang the warm carcasses in a refrigerated room of present day type where other carcasses are further along in the aging process the latter would also be subjected to the moist atmosphere with a generally slimy condition existing among all the carcasses—those being initially chilled and those already chilled and undergoing aging. The separate initial chill room for the overnight cooling entails considerable building and installation cost as well as additional labor or handling cost.

It is an object of this invention to provide a refrigeration system whereby the chilling of the warm, freshly slaughtered carcasses takes place simultaneously and in the same room with the maintaining of the carcasses in a chilled state during the successive aging, hanging, selling, etc., stages without any harmful effects upon the carcasses—either those being cooled or those being maintained in a chilled state, thereby eliminating the necessity for the extra installation and handling involved with separate cooling rooms for the different processing stages.

It is another object to provide a refrigeration system whereby the carcasses are never enveloped with air that is saturated with moisture, and wherein there is no opportunity for turbulence to be set up in the air enveloping the carcasses that might carry moisture to the hanging carcasses, thereby eliminating any dripping and slimy condition of the carcasses.

Another object is to keep the chilled carcasses free from moisture and slime without their undergoing loss of weight caused by dehydration.

Another object is to produce chilled and aged meat carcasses of improved appearance and improved quality.

A related object is to provide apparatus for use in the practice of the improved process of refrigeration.

These and other objects accomplished by the method and apparatus of my invention will become obvious from the ensuing description and the appended claims.

The invention is exemplified in the following description and illustrated by way of example in the accompanying drawings in which:

Fig. 1 is a plan sectional view of an end portion of a single chill room and of a compartment adjoining said room containing refrigerating coils and blower fans, the righthand part of Fig. 1, between the two irregular lines being taken higher up, near the ceiling of said room through warm air return ducts.

Fig. 1A, which is complementary to Fig. 1, is a plan sectional view of the other end portion of said chill room taken at the same level as the right hand part shown in Fig. 1.

Fig. 2 is a side elevation sectional view on line 2—2 of Fig. 1.

Fig. 2A, which is complementary to Fig. 2, is a side elevation sectional view on line 2A—2A of Fig. 1A.

Fig. 3 is a sectional view on line 3—3 which cuts through both Fig. 1 and Fig. 1A. It is also a sectional view on line 3—3 of Fig. 2.

Fig. 4 is an enlarged sectional view on line 4—4 of Fig. 2A showing the louver structure for controlling and directing cold air entrance into the chill room.

Fig. 5 is a side elevation of the louver structure of Fig. 4.

Referring now to the drawings, the single chill room is generally designated by the reference numeral 10. The side walls 11, the end walls 12 and the ceiling 13 of said room are provided with the conventional insulation employed for large refrigerated space. It will be noted, however, that the floor 14 (Figs. 2, 2A and 3) of said room is without insulation. The floor may be of impervious concrete or any suitable construction. Below the floor along each side of the room 10 and extending the full length of the room is a cold air tunnel generally designated as 15. When the floor of the room is a concrete slab resting on the ground, space for the said two tunnels would be provided for by excavation. The side walls of the two tunnels, as well as the end walls, are desirably insulated. Since these cold air tunnels are directly below the chill room, they need not be insulated at their ceilings. The cross-sectional area of these tunnels may vary considerably depending upon the volume and velocity of air to be carried, its temperature and other conventional factors. A series of spaced openings 16 through the floor of the chill room into said tunnels and positioned throughout substantially the entire length of the room, permits cold air to pass from the tunnels into the chill room. In the installation shown in the drawings these openings are rectangular in shape approximating 8 inches in width, by a little less than three feet in length, being separated by extensions 17 of the floor 14 so as to provide suitable construction members to tie the floor of the chill room to its side walls. A curb 18 (best seen in Figs. 3 and 4) rises from the floor of the chill room along the inner edges of openings 16 and extends along each side of the room. A series of spaced upright bars 19 (Fig. 4 and Fig. 5) secured to the curb 18 by bolts 20 extend upwardly from said curb and are bent outwardly so as to be secured to the side walls 11 of the chill room by bolts 21. A series of cover plates 22, of sheet metal or other suitable material and secured to said bars 19 by bolts 23, extend downwardly and inwardly from the side walls 11 and terminate with their lower edges at some distance above the top of said curb 18 so as to form with said wall and said curb a cold air receiving compartment 24 extending along each side of the chill room over the series of openings 16 in the floor of said chill room, said cold air receiving compartment having in its inner side face a series of elongated side openings 16', one said opening between adjacent bars 19, whose vertical height is the distance from the lower edge of said cover plate 22 to the top of said curb 18. Said side openings provide an elongated passageway for the entrance of cold air into said room, which is continuous along each side of the room except for the narrow bars 19 which support the said cover plates 22.

A control louver 25, comprising an elongated rectangular plate-like member, made of sheet metal or other suitable material, arcuate shaped along one side, is pivotally mounted intermediate its two sides, on adjacent vertical bars 19 and adapted to swing about a horizontal axis between said adjacent vertical bars, the length of said louver and the width of the flat portion thereof being such that when said flat portion is rotated into a vertical plane the louver substantially closes the said side opening entrance 16' between adjacent bars from said cold air receiving compartment 24 into the chill room. The louver is positioned so that when in such closed position the arcuate side thereof is the upper side and extends rearwardly into compartment 24. It will thus be seen that when the louver is turned on its axes so that the upper side is tilted back into compartment 24 the lower side of the louver extends outwardly and downwardly into the chill room and that there is then an open passageway from compartment 24 into the chill room 10 both above and below the tilted louver. It will also be seen that with the arcuate portion of sufficient width the tilting of the louver may be such as to bring the edge of said arcuate portion in contact with the wall 11 so that the louver then practically becomes the ceiling of compartment 24, and the main passageway into chill room 10 for cold air flowing from tunnel 15 through compartment 24 becomes the space below the louver. It will further be seen that in this last described position the air flowing from compartment 24 into the room is directed downwardly toward and laterally across the floor of chill room 10. It will be obvious that when the louver is tilted to positions intermediate between said last described position and the closure position first above referred to the control of the direction of the flowing air as it enters the chill room will be varied accordingly. The louver may even be adapted, if desired, to be rotated so as to take the position shown by the slanted dotted line in Fig. 4. By having one such louver for each two adjacent vertical bars 19 it will be seen that substantially the entire side opening throughout the length of compartment 24 along each side of the chill room 10 will be provided with the adjustable regulating device afforded by the series of louvers. Due to the fact that in any tilted position the louver must clear the adjacent bars 19, there will be a small space within compartment 24, between adjacent ends of the louvers, through which the flowing air may pass into the upper part of compartment 24 and thence outwardly above the louvers into room 10. This space is small compared to the openings below the louvers into room 10. A side view of the louvers, openings between supporting vertical bars for the louvers, the inner top portions of compartments 24 as seen from inside room 10 by one looking at the far side of said room are shown in Fig. 2A.

Any suitable mounting means may be provided by which the louvers may be moved to any desired tilted position. In the example shown a horizontally extending spindle 27 is welded or otherwise secured to bar 19 over which a yoke 28 secured to the louver 25 is rotatably fitted, one such spindle and yoke being on each end of each louver. Said yoke may be drilled to threadedly receive a set screw (not shown) for turning against spindle 27 to hold the louver in any tilted position. Any suitable holding means may be employed.

The cold air that is caused to flow through the tunnels 15 and thence through the compartments 24 into room 10 is cooled to a desired temperature by refrigeration coils conventionally used for such purposes, suitably positioned without said room 10. In the installation shown a separate refrigeration compartment 29 is built adjacent to the chill room 10, at one end and below the floor level thereof, and communicates through appropriate openings, not shown, in its end partition walls, with two separate end compartments 30, said end compartments being in open communication with the cold air tunnels 15 extending, as aforesaid, along each side of and underneath the floor of the chill room 10. Refrigeration coils 31, shown only diagrammatically, are positioned within said refrigeration room 29. As hereinabove stated, these coils are of the conventional type and are generally provided with "fins" for increasing heat transfer. Motor driven blowers 32, diagrammatically shown, one positioned in each of said end compartments 30 pull air upwardly around the refrigeration coils, thence through the two end compartments 30, and thence into said blowers from whence it is discharged into the cold air tunnels 15.

A pair of warm air ducts 33, provided with a series of intake openings 34 located preferably in both the side and bottom walls of said ducts, positioned within and near the ceiling of chill room 10, extend throughout substantially the full length of the said room; and at the end thereof adjacent said refrigeration compartment 29 extend downwardly and communicate through appropriate partition wall openings 35 (Fig. 2), with the refrigeration compartment 29 at a level below that of the refrigerating coils 31.

The area of all said intake openings 34 is substantially the same as the area of all the cold air intake openings 16'. It is preferable that these warm air intake openings 34 be dispersed throughout the length of the said ducts at sufficient intervals that the warm air exits from the room substantially match the louvered openings 16' for cold air entering near the floor of the room. Thus in the installation shown in the drawings the louvered openings 16' are on three foot centers and the warm air intake openings 34 positioned in the bottom of said ducts 33 are on six foot centers and those positioned in the side of said ducts are on six foot centers but are staggered with respect to those in the bottom. Thus there is substantially a warm air intake opening 34 into duct 33 for each louvered cold air opening 16 and of approximately the same area, the two being substantially opposite each other and substantially in the same transverse plane cutting across the room. This provides that the air that is directed across the room from each louvered opening 16' and which thus rises toward the ceiling of the room finds ready exit from the room without any substantial movement longitudinally of the room and therefore without any eddying or turbulence of air currents being set up in the room. The position of the warm air intake openings may vary from this preferred arrangement, an essential feature to be observed being that they are so positioned and are of such area that the mass of cold air formed across the floor of the room by the action of the louvers in the cold air inlets 16' may rise steadily and at substantially a uniform rate of flow throughout the height of the room and exit into the warm air ducts in substantially complete absence of any turbulence that would counteract the carcasses being continuously enveloped and "brushed" by a rising mass of air. In the drawings cold air movements are generally represented by solid arrows and warm air by dotted arrows.

Conventional I-beams 36 or other suitable means are installed in the upper part of room 10 with which carriages and other suitable means, not shown, are associated for the hanging and storage of the carcasses 37, diagrammatically shown in dotted lines (Fig. 3 and Figs. 2 and 2A) of slaughtered animals.

As seen from the foregoing description and explanations, cold air entering the chill room 10 through the passageways along each side of the room is directed by the louvers laterally across the room. This will result in a substantially uniform distribution of the cold air, after it enters the room, across the bottom of the room. Due to the continuous entrance of cold air and its thus distribution across the room there will result a continuous and substantially uniform upward mass movement of cold air throughout substantially the entire cross section of said room. It will thus be seen that carcasses of slaughtered animals hung in said room will be continuously subjected to and be swept by this always unidirectionally moving mass of cold air, during which the said air absorbs heat from said carcasses. As this rising body of air reaches the upper part of the room it will be forced continuously into the ducts positioned in the top of the room without substantial turbulence in said room, and conveyed thence to the refrigeration compartment 29 where it is drawn between and over the refrigerating coils to become cooled again, from whence it is again forced by the blowers through the said tunnels to the chill room and the circuit repeated. The air intake openings 34 may desirably be provided with any conventional means (not shown) for adjusting their area to that which is commensurate with the area of the louvered openings 16' as the area of the latter may from time to time be changed by manipulation of the pivoted louvers.

The distribution across the floor of the chill room of the entering cold air may be accomplished with the cold air tunnels positioned elsewhere than underneath the floor of the chill room. Due to the character of soil or rock or other earth formation encountered in construction, or for other reasons, it may be expedient to position these tunnels alongside the side walls exterior of the room so that they rest at the same general foundation level as that of the room. In such event appropriate openings through the side wall of the room and communicating between the tunnel and the room are provided and the adjustable louvers positioned in such openings to direct the entering cold air downwardly toward and across the floor of the room. The tunnels may even be positioned inside the room, as for example, one along each of two opposing walls and generally at floor level, with appropriate openings in either the top or the side of the tunnel to receive the adjustable pivoted levers which latter in turn direct the air downwardly toward and across the floor of the room. Such position of the cold air tunnels would have the disadvantage of taking up space within the chill room that could otherwise be devoted to the hanging of carcasses.

In the mass movement of cold air upwardly through the room moisture from the carcasses, and other water vapor with which the air becomes laden as it becomes warmed in rising through the chill room, is deposited as condensation and/or frost on the refrigerating coils. Thus the air environment of the carcasses can never become saturated with moisture and the carcasses are kept dry and free from any moist and slimy condition. Each individual carcass hanging from the rails in the chill room is swept by a rising mass of air and is free from any contamination by moisture or otherwise from any neighboring carcasses. Discoloration and spoilage are eliminated and an improved quality of meat results. From experience with my system in actual commercial installations it seems that a glaze is imparted to the surface of the chilling carcasses, which may explain the fact that there is substantially no loss of weight and shrinkage due to dehydration of the carcasses. Moreover, when the carcasses of freshly slaughtered animals are stored in the chill room no deposition of moisture on the chilled carcasses already in the storage room takes place. Thus the necessity for separate cooling roms for the warm carcasses of freshly slaughtered animals is eliminated, with consequent saving in construction and handling costs. One such material saving arises from the fact that there is no need for insulating the floor slab of the chill room, when the tunnels are located therebeneath. Cooling, aging and other hanging stages of the carcasses from the time the animals are slaughtered up to and including the selling stage, can all take place in a single chill room.

In a commercial installation embodying my invention, said installation comprising a single chill room approximately 72 feet long, 42 feet wide and 15 feet high, accommodating the hanging of the carcasses from 336 cattle averaging 600 lbs. each, a cold air tunnel 4½ feet wide and 6½ feet high extending the full length of each side wall of the room, with a motor driven blower fan discharging 25,500 cubic feet per minute of cold air into each said tunnel and with a chilling capacity of the refrigerating coils such that the temperature of all warm carcasses hung in said room may be lowered from 100° F. to 34° F. in twenty-four hours, the following data were taken:

At 9:30 a. m., with the carcasses from 55 freshly slaughtered cattle in the room, the balance of the chill room being occupied with chilled beef carcasses:

Temperature at the louvers_____°F__ 32
Relative humidity at the louvers_____percent__ 95
Temperature at return ducts_____°F__ 42
Relative humidity at return ducts_____percent__ 96 at 2:00 p. m. same day with 156 fresh warm carcasses in the same room:

Temperature at the louvers_____°F__ 28
Relative humidity at the louvers_____percent__ 95
Temperature at return ducts_____°F__ 44
Relative humidity at return ducts_____percent__ 96

At both times the temperature at a five foot elevation from the floor was 36° F.

There was no condensation of moisture on any of the carcasses.

These data show that in the mass of air that was continuously moving upwardly around the carcases there was an absence of any saturated moisture content, even wth the introduction of large numbers of warm carcasses.

As stated hereinabove any moisture picked up by the upwardly rising air in the room is deposited on the fins and other parts of the refrigeration coils so that the air as it enters the chill room through the louvered openings is below saturation with moisture. These coils are at intervals from time to time defrosted for efficient refrigeration.

While I have illustrated and described my invention in detail, it is understood that various modifications may be made therein by those skilled in the art without departing from the spirit and scope of the invention as defined in the appended claims.

I claim:

1. In a refrigerating system for simultaneously cooling, aging and hanging until ready for sale, the carcasses of slaughtered animals, while maintaining a supply of such carcasses undergoing refrigeration by adding thereto from time to time the warm carcasses of freshly slaughtered animals, said refrigerating system including refrigeration coils and blower fan means to draw air between and over said coils to produce cold air of appropriate temperature for use in said refrigerating system, the improvement comprising a single room within which the cooling of the warm carcasses of freshly slaughtered animals and the aging of carcasses already chilled simultaneously takes place, a series of small openings into said room along at least one side thereof in proximity to the floor of said room adjustable louvers positioned in said openings sloping inwardly and downwardly toward the floor of said room and adapted to direct both downwardly and across the floor of said room, cold air entering said room through said openings, means for forcing air chilled by said refrigerating coils to and through said openings, a compartment to house said coils separate and apart from said room, an air duct positioned in proximity to the ceiling of said room, ports in said air duct communicatnig between the upper part of said room and said duct, said ports being positioned one opposite each said louvered opening and having an area approximately equal to that of its paired louvered opening, said duct leading to and communicating with the said compartment for said coils.

2. In a refrigerating system for simultaneously cooling, aging and hanging until ready for sale, the carcasses of slaughtered animals, while maintaining a supply of such carcasses undergoing refrigeration by adding thereto from time to time the warm carcasses of freshly slaughtered animals, said refrigerating system including refrigeration coils and blower fan means to draw air between and over said coils to produce cold air of appropriate temperature for use in said refrigerating system, the improvement comprising a single room within which the cooling of the warm carcasses of freshly slaughtered animals and the aging of carcasses already chilled simultaneously takes place, a cold air tunnel beneath the floor of said room and extending along the side thereof, a curb rising from the floor of said room adjacent said tunnel, parallel to and spaced from the wall of said room to form a narrow cold air receiving compartment extending along the side of said room adjacent the floor thereof, a series of openings through the floor of said room from said tunnel into said cold air receiving compartment, upright bars spaced apart from each other having their lower end secured to said curb and their upper ends bent toward and secured to the adjacent wall of said room, cover plates secured to said bars extending from said wall to a line spaced above the top of said curb to enclose said narrow compartment leaving a series of elongated horizontal openings therefrom into said room above said curb and between said upright bars, a louver mounted in each of said horizontal openings sloping downwardly and inwardly from within said compartment toward the floor of said room to direct cold air rising in said cold air receiving compartment across the floor of said room, an airduct positioned in the upper part of said room having ports therein for the entrance of air rising toward the ceiling of said room, said ports having an area approximately that of said louvered openings and positioned along said duct so that there is one said port approximately opposite each said louvered opening, said duct leading to a refrigerating compartment containing said refrigerating coils, and said blower associated with said refrigerating compartment adapted to discharge into said tunnels the air that has been chilled by its passage over and between said coils.

3. A refrigerating system in accordance with claim 2 in which said louver is pivotally mounted to said upright bars to be turned about a horizontal axis intermediate its two sides, a part of said louver on the compartment side of said axis being arcuately downwardly shaped.

4. In a refrigerating system for simultaneously, and in a single chill room, cooling the warm carcasses of freshly slaughtered animals added to said room from time to time and aging the carcasses of other slaughtered animals present in said room, said system including refrigeration means for cooling air from said room to appropriate temperature for use in said system, the improvement comprising a single room adapted to have hanging therein the carcasses of slaughtered animals undergoing aging and to receive from time to time the warm carcasses of freshly slaughtered animals to be hung therein while there remains hanging therein carcasses undergoing said aging, a cold air tunnel adjacent the floor of said room and extending the length of a side of said room, a series of passageways communicating from said tunnel into said room adjacent the floor thereof and positioned uniformly throughout the length of said tunnel, adjustable means associated with the exits of said passageways into said room adapted to direct cold air entering said room from said passageways laterally across the floor of said room, an air duct positioned adjacent the ceiling of said room having ports therein for the entrance of air rising toward the ceiling of said room, said duct leading to said refrigeration means, and means for circulating air from said duct through said refrigeration.

5. The refrigerating system of claim 4 wherein said means associated with the exits from said passageways into said room comprise adjustable louvers adapted to be moved into positions suitable for directing across the floor of said room air entering the room from said passageways for different rates of flow of said air.

6. The refrigerating system of claim 5 wherein the ports of said air duct adjacent the ceiling of said room have an area approximately that of said louvered openings into said room.

7. In a refrigerating system for simultaneously, and in a single room, cooling the warm carcasses of freshly slaughtered animals added to said room from time to time and ageing the carcasses of other slaughtered animals present in said room, said system including refrigeration means for cooling air from said room to appropriate temperatures for use in said system, the improvement comprising a single room adapted to have hanging therein the carcasses of slaughtered animals undergoing ageing and to receive from time to time the warm carcasses of freshly slaughtered animals to be hung therein, a cold air tunnel along a side of said room in proximity to the floor of said room, a series of passageways leading from said tunnel and opening into said room in proximity to the floor of said room throughout substantially a length of said room, adjustable means associated with the exits of said passageways into said room adapted to direct cold air entering said room from said passageways laterally across the floor of said room, an air duct in proximity to the ceiling of said room, a series of ports in said air duct communicating between the upper part of said room and said duct throughout a substantial length of said room, said duct leading to said refrigerating means, and means for circulating the air entering said duct from said room through said refrigerating means and thence through said tunnel and said passageways into said room.

References Cited in the file of this patent
UNITED STATES PATENTS

| | | |
|---|---|---|
| 1,465,028 | Stacey | Aug. 14, 1923 |
| 2,012,559 | Friedrich | Aug. 27, 1935 |
| 2,259,007 | Story et al. | Oct. 14, 1941 |
| 2,494,024 | Williams | Jan. 10, 1950 |
| 2,629,232 | Latham | Feb. 24, 1953 |
| 2,705,678 | Morrison | Apr. 5, 1955 |